United States Patent
Peter

(10) Patent No.: US 6,911,760 B2
(45) Date of Patent: Jun. 28, 2005

(54) ELECTRICAL MACHINE

(75) Inventor: Ulrich Peter, Wendingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/672,383

(22) Filed: Sep. 26, 2003

(65) Prior Publication Data

US 2004/0113510 A1 Jun. 17, 2004

(30) Foreign Application Priority Data

Dec. 16, 2002 (DE) .......................... 102 58 606

(51) Int. Cl.[7] .......................... H02K 15/02; H02K 1/06
(52) U.S. Cl. .................. 310/217; 310/216; 310/259
(58) Field of Search .................. 310/217, 216, 310/218, 259, 258, 254, 89; 29/596–598

(56) References Cited

U.S. PATENT DOCUMENTS

| | | | | |
|---|---|---|---|---|
| 4,538,345 A | * | 9/1985 | Diederichs | 29/596 |
| 5,043,616 A | * | 8/1991 | Katsuzawa et al. | 310/91 |
| 5,142,178 A | * | 8/1992 | Kloster et al. | 310/217 |
| 6,455,976 B1 | * | 9/2002 | Nakano | 310/254 |

FOREIGN PATENT DOCUMENTS

| | | |
|---|---|---|
| DE | 35 01 269 A1 | 7/1986 |
| GB | 941 455 | 11/1963 |
| GB | 1 200 279 | 7/1970 |

* cited by examiner

*Primary Examiner*—Darren Schuberg
*Assistant Examiner*—Leda T. Pham
(74) *Attorney, Agent, or Firm*—Michael J. Striker

(57) ABSTRACT

An electric motor for electric hand power tools has a housing, a stator received in the housing and having a stator body composed of a plurality of axially abutting lamellas, at least one of the lamellas located in at least one end side end region of the stator body having raised portions which axially extend over a lamella surface, the stator body being clamped between radially extending housing parts in an axially force-transmitting manner.

11 Claims, 1 Drawing Sheet

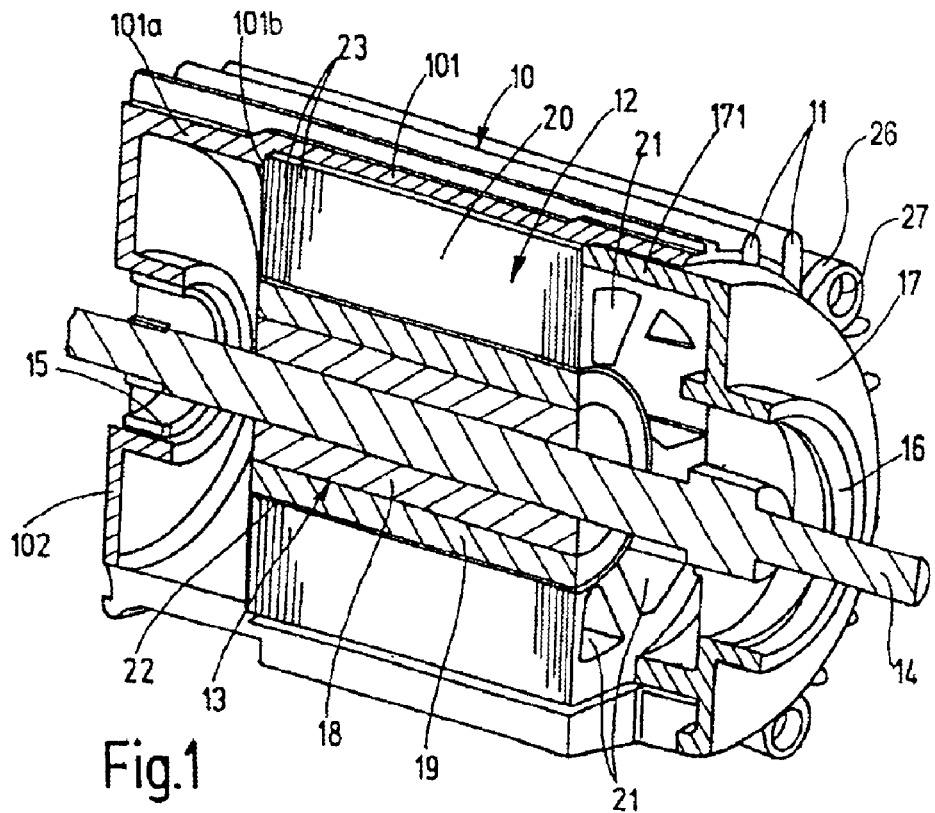
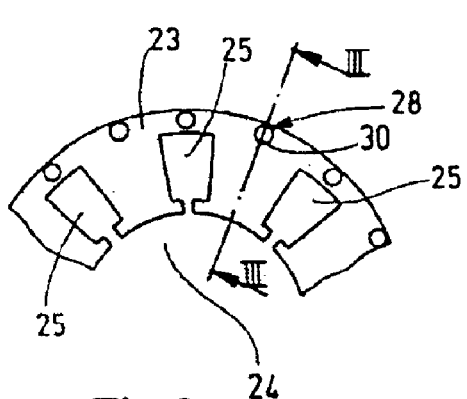
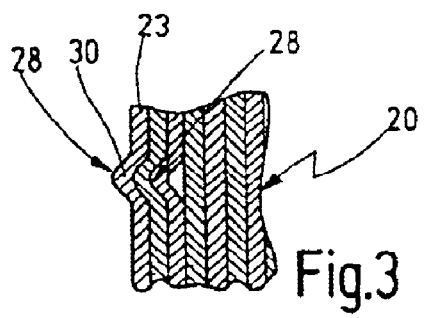
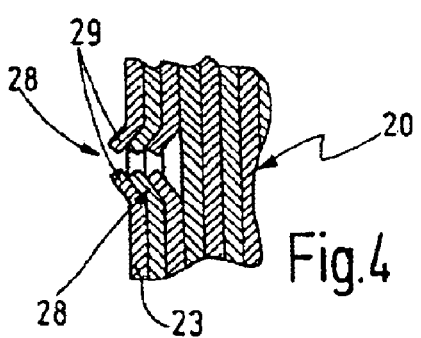

ELECTRICAL MACHINE

BACKGROUND OF THE INVENTION

The present invention relates to an electrical machine, in particular to an electric motor for electric hand power tools.

Permanent magnet excited small-size motors, such as for example the motors which are used in electric hand power tools for craftsmen or armateurs, have a stator and a rotor which surrounds the stator and carries permanent magnets located on a rotor shaft for joint rotation with it. The stator is received non-rotatably in a housing, in which also a rotor shaft is rotatably supported. The stator has a stator body with axial grooves and a stator winding inserted in the axial grooves. The stator body is assembled of sheet metal lamellas which have an identical blank profile with a central, circular opening for passage of a rotor and the same number of groove openings, which in a stator body composed of the layers coincide with one another to form the axial grooves for receiving the stator winding. The connection of the individual sheet metal lamellas to form the stator bodies performed by a so-called stamping. The stator body with the windings is inserted in the housing and fixed axially non-displaceably and non-rotatably by glueing, pressing, caulking, screwing or shrinking.

It is believed that the known electrical machine can be further improved.

SUMMARY OF THE INVENTION

Accordingly, it is an object of the present invention to provide an electrical machine of this type which avoids the disadvantages of the prior art.

In keeping with these objects and with others which will become apparent hereinafter, one feature of the present invention resides, briefly stated, in an electric motor for electric hand power tools, comprising a housing, a stator received in said housing and having a stator body composed of a plurality of axially abutting lamellas, at least one of said lamellas located in at least one end side end region of said stator body having raised portions which axially extend over a lamella surface, said stator body being clamped between radially extending housing parts in an axially force-transmitting manner.

The electrical machine designed in accordance with the present invention has the advantage that the axial lifted or raised portions formed in the lamellas of the stator body are pressed during the axial clamping of the stator body between the radially extending housing portions into the neighboring lamellas and into the housing parts and thereby produce a form-locking and force-transmitting securing against rotation of the stator in the housing.

For mounting of the stator in the housing after its insertion, in addition to the application of the axial pressing force, for example by axial screwing of the radially extending housing parts, no further mounting steps are needed. In addition, with the inventive axial lifted or raised portions, an axial tolerance compensation is possible, that allows moreover coarser tolerances in the lamellas thickness. The shortened mounting time and the allowed greater tolerance region lead to reduction of the manufacturing costs.

In accordance with a preferable embodiment of the invention, in each end region of the stator body at least one lamella provided with the raised portions is available. Preferably, the at least one lamella is the outwardly located end lamella which presses with the axial lifted portions or raised portions against the radial housing parts. Thereby the securing against rotation between the housing and the stator body is obtained, which reliably prevents the relative movement of stator body relative to the housing.

In accordance with an advantageous embodiment of the present invention, in each end region of the stator body several neighboring lamellas are provided with the raised portions. This raised portions can be arranged so that they are in alignment with one another, and in the assembled stator body engage with one another. However, they can be arranged in the neighboring lamellas, so that they are turned relative to one another. With these features they securing against turning within the lamellas pack is obtained, and moreover a greater axial tolerance compensation is possible.

In accordance with another embodiment of the invention, the raised or lifted portions can be formed by corrugations or notches which are pressed in the lamellas. However, they can be also formed by punching of cuts in the lamellas with subsequent bending.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a per respective view of an electric motor for an electric hand power tool in a semi section, showing a housing, a stator and a rotor;

FIG. 2 is a cut-out portion of a plan view of a lamella of the stator of the inventive electric motor of FIG. 1;

FIG. 3 is a view showing a section taken along the line III—III in FIG. 2 through the inventive electric motor;

FIG. 4 is a same view as in FIG. 3, but with modified lamellas of the inventive electric motor.

DESCRIPTION OF THE PREFERRED EMBODIMENTS

FIG. 1 shows a perspective view of sectioned half of a permanent magnet-excited electric motor for an electric hand power tool, as an example of the present invention. The electric motor has a cup-shaped housing 10 with a hollow-cylindrical wall 101 and a cup bottom 102. Cooling ribs 11 are formed on the outer surface of the cup wall 101. A stator 12 and a rotor 13 are located in the housing 10.

The rotor 13 is arranged non-rotatably on a rotor shaft 14 which is rotatably supported in the housing 10. One end of the rotor shaft 14 is received in a radial bearing 15 formed in the cup bottom 102. The other end of the rotor shaft 14 is received, by means of a second radial bearing 16, in a bearing plate 17 arranged at the end side and closing the cup opening of the housing 10. Only bearing shells of the radial bearings 15 and 16 are shown in FIG. 1.

The cylindrical cup wall 101 extends radially at an axial distance from the cup bottom 102, so that a wall portion 101*a* is formed next to the cup bottom 102. It has a smaller inner diameter than the cup wall portion located before it, so as to form a ring-shaped, radially inwardly extending supporting portion 101*b*. A ring web 171 extends from the inner side of the bearing flange 17 which faces the cup opening. During placing of the bearing flange 17 on the housing 10, it is introduced into the interior of the housing 10 and beveled on the inner surface of the cup wall 101.

The rotor 13 which is schematically shown in FIG. 1 and carries shell-shaped permanent magnet segments 19 on the outer surface of a rotor core 18, which is preferably composed of metal plates. The permanent magnet segments 19 are magnetized in a radial direction, so that in the neighboring permanent magnet segments the magnetization direction is inverse.

The stator 12 has a stator body 20 with a plurality of axial grooves 21 which are arranged equidistantly over the circumference, and also a stator windings inserted in the axial grooves 21. In FIG. 1 for the sake of clarity they are not shown, so that only the stator body 20 of the stator 12 is illustrated. The winding wire for the stator winding is wound conventionally many times in the axial grooves 21. In each the axial groove 21 a plurality of parallel electrical conductors are inserted, which are connected with one another by winding heads extending over the end sides of the stator body 20. The stator body 20 concentrically surrounds the rotor 13 with a working air gap 22 to the permanent magnet segments 19. The stator body 20 is assembled of a plurality of individual metal plate lamellas 23 that have an identical blank profile and are arranged on one another in the axial direction of the rotor body 20.

FIG. 2 shows a section of a plan view of a lamella 23 of the stator body 20. It has a central opening 24 which is determined by the outer diameter of the rotor 13 and the radial width of the air gap 22, and also a plurality of equidistant groove openings 25. The shape of their inner cress-section corresponds to the axial grooves 21. The lamellas 23 which are punched with the above described blank are layered over one another to form the stator body 20. The groove openings 25 are in alignment with one another and follow the axial grooves 21 in the stator body 20. The stator body 20 provided with the wound stator windings is inserted axially through the cup opening into the housing 10, until the frontmost end lamella 23, as considered in the insertion direction, abuts against the abutment shoulder 101b formed in the housing 10. After this the bearing flange 171 is placed on the housing 10, and its ring web 171 abuts with its ring-shaped end surface against the other end lamella 23, which is the last in the insertion direction of the stator body. When the bearing plate 17 is screwed to the housing 10, the ring web 171 presses against the stator body 20 in a force-transmitting manner. For screwing the bearing flange 17, lugs 26 are uniformly distributed over the circumference and provided with throughgoing openings 27 for the screws, and axial threaded openings are provided in the cup wail 101 or in the cooling ribs 11 for screwing-in of the screws.

For fixing the stator body 20 non-rotatably In the housing 10, the both end lamellas 23, or in other words both outermost lamellas of the stator body 20, are provided with axial lifted over raised portions 28. They project on the lamella surface of the both lamellas 23 at the side facing the cup bottom 102 over the bearing flange 17. FIG. 2 shows the raised portions 28 for the left end lamella 23 of the stator 20 of FIG. 1. These raised portions 28 are produced for example by corrugations 30 or notches, which are pressed in the other lamella surface of the end lamella 23. The profile of such a corrugation 30 or a notch is shown in FIG. 3. Alternatively, a raised portion 28 can be also formed by a cut 29 which is punched or cut in the end lamella 23 and then bent out of the lamella plane as shown In FIG. 4.

When the bearing flange 17 is fixed by the screws on the housing 20 the pack of the lamellas 23, which abuts against the abutment shoulder 101b and forms the stator body 20, is compressed by the ring web 171 on the bearing plate 17. Thereby the raised portions 28 press in the end lamellas 23 in the abutment shoulder 101b and in the ring-shaped end surface of the ring web 171 and form a reliable protection from turning, which blocks a relative turning of the stator body 20 in the housing 10.

The above described shape of the raised portions 28 which are formed as corrugations 30 in FIG. 3 or bent cuts 29 of FIG. 4, must not be limited only to the both end lamellas 23 of the stator body 20. As shown in FIGS. 3 and 4, several neighboring lamellas 23, located for example in the end regions of the stator body 20, can be also provided with such raised portions 28. Thereby an increased safety from turning between the lamellas 23 is facilitated and additionally a greater axial tolerance compensation for compression of several raised portions 28 located near one another in the axial direction is possible. The raised portions 28 in the neighboring lamellas 23 can be oriented so that they coincide with one another, so that the raised portions 28 of one lamella 23 engage in the depressions of the other lamella 23, formed for production of the raised portions 28 in the lamella 23 by making corrugations or bending of the cut 29. The raised portions 28 can be oriented arbitrarily, so that always one raised portion 28 abuts against a plane surface of the neighboring lamella 23.

It will be understood that each of the elements described above, or two or more together, may also find a useful application in other types of constructions differing from the types described above.

While the invention has been illustrated and described as embodied in electric machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An electric motor for electric hand power tools, comprising a housing, a stator received in said housing and having a stator body composed of a plurality of axially abutting lamellas, at least one of said lamellas located in at least one end side end region of said stator body having raised portions which axially extend over a lamella surface, said stator body being clamped between radially extending housing parts in an axially force-transmitting manner in such a manner that the raised portions of the lamellas are clamped to a housing cart in said force-transmitting manner, and wherein a form-locking connection is established when the raised portions dig info neighboring housing walls.

2. An electric motor as defined in claim 1, wherein said at least one lamella provided with said raised portions is located in each end region of said stator body.

3. An electric motor as defined in claim 2, wherein said at least one lamella in each end region of said stator body is an outwardly located end lamella of said stator body.

4. An electric motor as defined in claim 1, wherein in each end region of said stator body, several neighboring lamellas are disposed, wherein said neighboring lamellas are provided with said raised portions.

5. An electric motor as defined in claim 4, wherein said lamellas are oriented so that said raised portions are in axial alignment with one another.

6. Art electric motor as defined in claim 1, wherein said raised portions are formed by corrugations provided in said at least one lamella.

7. An electric motor as defined in claim 1, wherein said raised portions are formed by notches provided in said at least one lamella.

8. An electric motor as defined in claim 1, wherein said raised portions in said at least one lamella are formed as punched and bent cuts in said at least one lamella.

9. An electric motor as defined in claim 1, wherein said radially extending housing parts are disposed in an interior of said housing and on a bearing flange which receives a rotor shaft, that is axially placed on said housing and connected with the housing in a force-transmitting manner.

10. An electric motor as defined in claim 8; further comprising a force-transmitting connection selected from the group consisting of a screw connection, a rivet connection, and both.

11. An electric motor as defined in claim 9, wherein one of said housing parts is a ring-shaped radial abutment shoulder which is formed on said housing, while another of said housing parts is formed as a ring web which extends in an end surface of said housing and projects from said bearing flange.

* * * * *